March 11, 1924.
R. J. HOLDEN
STORAGE BATTERY
Filed April 1, 1922
1,486,434
2 Sheets-Sheet 1
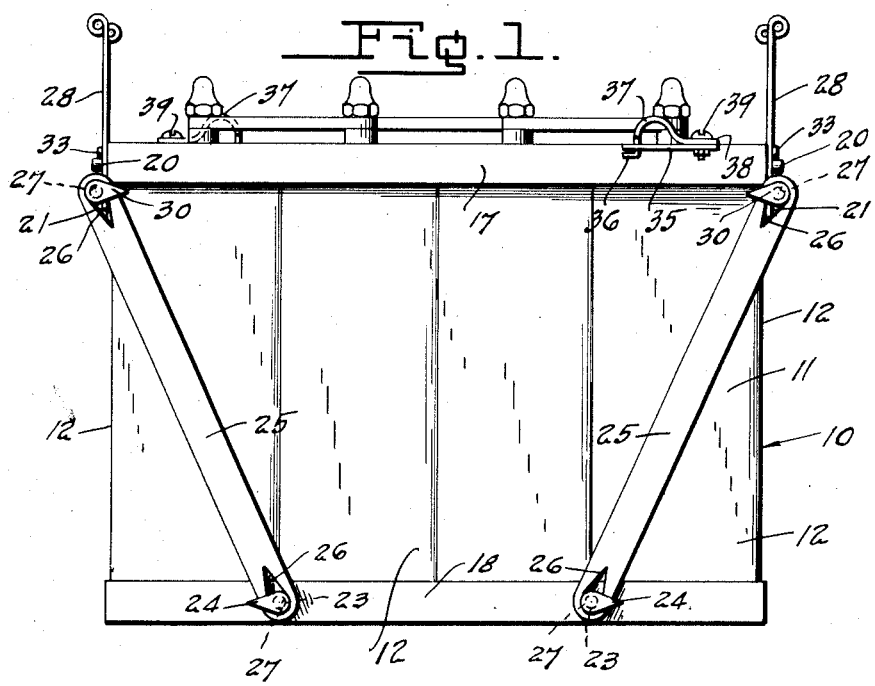
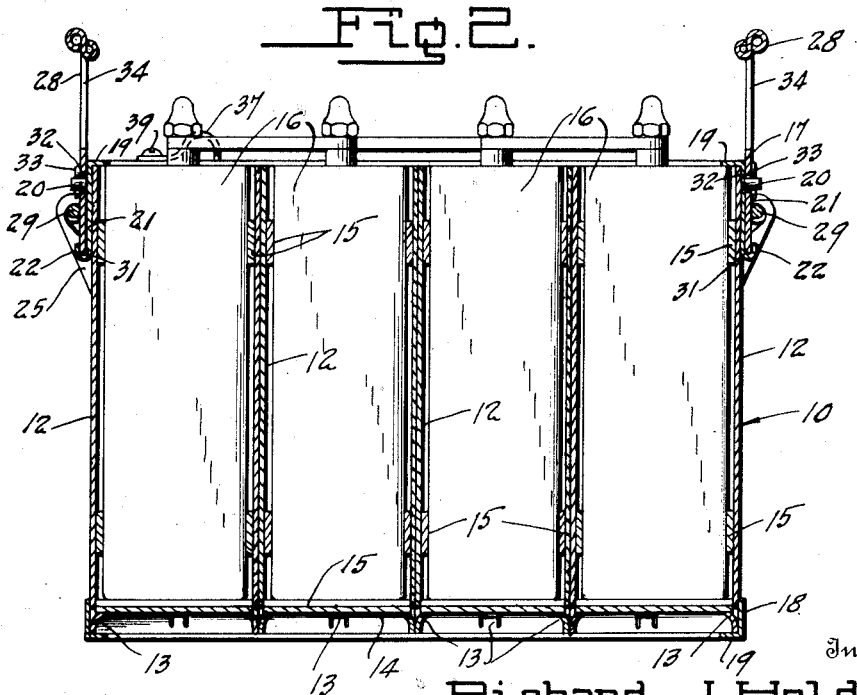
Inventor
Richard J. Holden
By Watson E. Coleman
Attorney March 11, 1924.

R. J. HOLDEN

STORAGE BATTERY

Filed April 1, 1922

Inventor
Richard J. Holden

By Watson E. Coleman
Attorney

Patented Mar. 11, 1924.

1,486,434

UNITED STATES PATENT OFFICE.

RICHARD J. HOLDEN, OF FORT MORGAN, COLORADO.

STORAGE BATTERY.

Application filed April 1, 1922. Serial No. 548,677.

*To all whom it may concern:*

Be it known that I, RICHARD J. HOLDEN, a citizen of the United States, residing at Fort Morgan, in the county of Morgan and State of Colorado, have invented certain new and useful Improvements in Storage Batteries, of which the following is a specification, reference being had to the accompanying drawings.

This invention relates to storage batteries, and an important object of the invention is to provide a new and improved storage battery cell container.

A further object of the invention is to provide a multiple cell storage battery wherein each of the cells of the battery is disposed within a separably removable container together with means clampingly engaging the cells and containers for maintaining the battery in assembled relation.

A further object of the invention is to provide in conjunction with a storage battery cell container a clamping device for engaging the upper and lower edges of the cell container and embodying a flange extending over the cells within the container to maintain the cells therein.

A still further object of the invention is to provide a clamping device of this character embodying cam plates which when in the position in which the elements of the clamping device are firmly engaged with the container and contained cells, the cam plates form handles by means of which the assembled battery may be moved.

A still further object of the invention is to provide a device of the above character which is simple in construction and arrangement and by means of which an economical and efficient metallic storage battery cell container may be constructed.

An additional object of the invention is to provide a storage battery which is simple in construction and arrangement, durable in service and a general improvement in the art.

These and other objects I attain by the construction and arrangement shown in the accompanying drawings wherein for the purpose of illustration is shown a preferred embodiment of my invention and wherein like reference characters designate like parts throughout.

In the drawings:

Figure 1 is a side elevation of a storage battery constructed in accordance with my invention;

Figure 2 is a sectional view taken through the storage battery casing;

Figure 3:
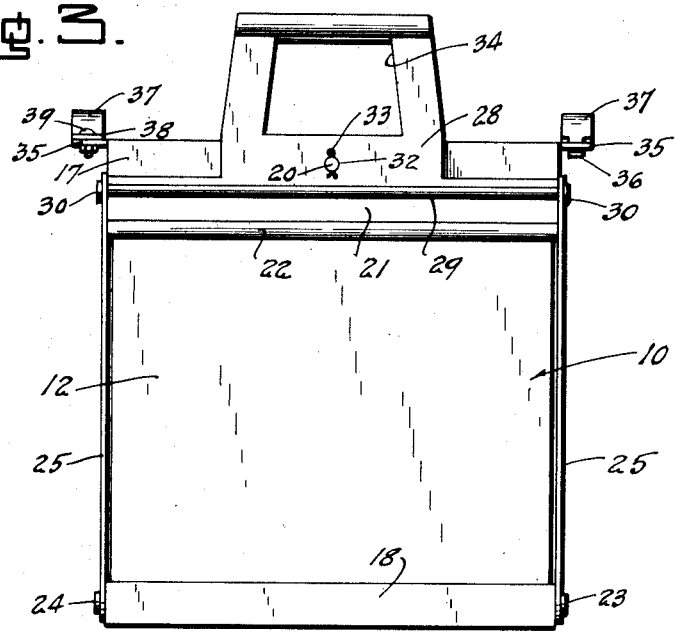
Figure 3 is an end elevation of a storage battery.
Figure 4:
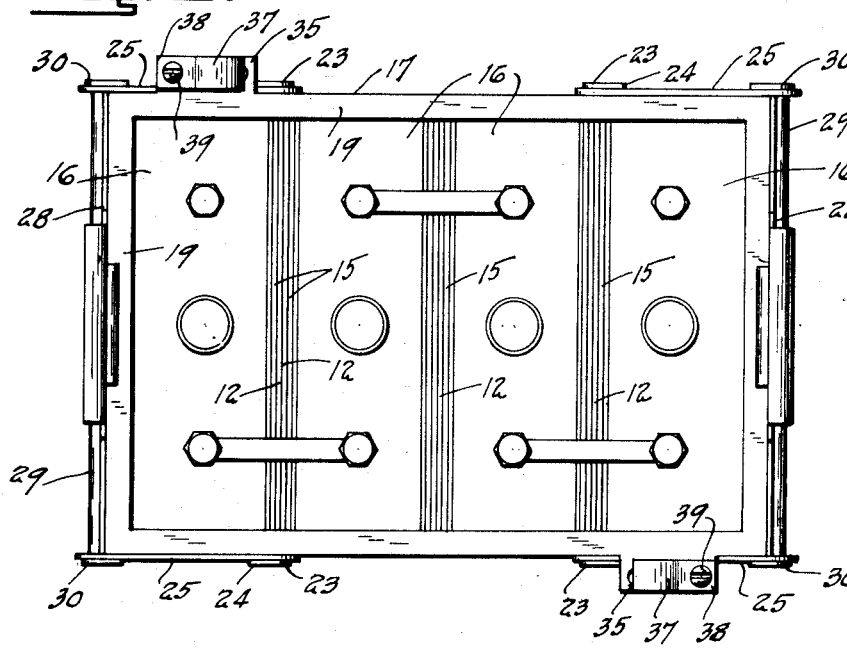
Figure 4 is a plan view thereof.

Referring now more particularly to the drawings, the numeral 10 indicates rectangular shells each adapted for the reception of a cell unit 16 and embodying side and end walls 11 and 12 each provided adjacent the bottom thereof with portions struck inwardly to form supports 13 upon which a removable sheet metal bottom or support plate 14 is disposed. Strips of resilient material 15, such as bands of rubber, are disposed about the side walls and upon the bottom plates and the cell units 16 are then arranged within the containers.

The numerals 17 and 18 indicate upper and lower rectangular frames, respectively, each embodying an inturned flange 19 adapted to engage against the top or bottom portion of the assembled containers. The inturned flange 19 of the upper frame 17 is of sufficient length to overhang the upper edge of the end and side walls 11 and 12 of the shells 10 to permit it to engage against the upper ends of the cell units 16 contained therein. The end portions of the upper rectangular frame are provided with outstanding studs 20 and with depending flanges 21, the lower ends of which are hook shaped as indicated at 22, the purpose of the studs 20 and flanges 21 appearing hereinafter.

Formed upon or secured to the sides of the lower rectangular frame member 18 adjacent each end thereof is a pivot stud 23 having an enlarged elongated head 24. The numeral 25 designates links, four in number, and each provided in its ends with openings 26 each having at their outer end a pivot receiving cove 27. An end opening 26 of each of the links is capable of permitting passage of the enlarged heads 24 of the stud pivots 23 of the lower rectangular frame 18 so that the cove 27 thereof may be engaged with the pivot.

The numeral 28 indicates cam plates, two in number, and each provided at the sides thereof with outstanding stud pivots 29 having enlarged heads 30. These enlarged heads are adapted to pass through the openings 26 at the opposite ends of the links 25 and to have the stud pivots 29 thereof engaged in the stud receiving cove 27. The lower edge 31 of the cam plate 28 is adapted to engage in the hook portion 22 of the depending flanges 21 formed upon the ends of the upper rectangular frame 17, these hook portions forming a pivot for the cam plates 28 whereby they may be rotated, bringing pressure to bear tending to cause the upper and lower rectangular frames to move one toward the other. Each cam plate is provided with an opening 32 which, when the cam plate is in the final or securing position, has extended therethrough the stud 20 formed upon its respective end of the upper rectangular frame 17, each stud 20 being provided with an opening through which may be extended a retaining pin or element 33 to prevent accidental pivotal movement of the cam plate after the same is in applied position. The cam plates are preferably provided upon their upper ends which will project above the upper extremity of the containers or shells 10 with openings 34 through which the fingers may be inserted to engage these cam plates to lift the battery. Attention is directed to the fact that the stud engagement with the cam plate not only maintains the cam plate in closed position but provides a solid engagement of the cam plate with the upper rectangular frame 17 preventing undue strain being placed upon the links and pivots in lifting the battery.

The side portions of the upper rectangular frame 17 are each provided with an outstanding flange 35 having a pair of openings formed therein, one of which is threaded. Through the other of these openings the angular tongue 26 of a conductor clip 37 is extended, the clip being removable by rotating the same so as to align the tongue 36 with the opening through which it passes. The clip is provided at its free end with an end portion 38 having an opening through which a headed screw-threaded element 39 may extend for engagement in the screw threads of the other opening to secure the conductor clip in closed position.

From the foregoing it will be observed that the cell containers are provided interiorly with means for cushioning the cells and that the clamping arrangement whereby the clamping action of the upper section is attained, permits forcing of the cell units 16 downwardly into engagement with such resilient elements, firmly holding them in position and preventing movement thereof. It will furthermore be obvious that when it is desired to remove the cells, this may be done much more expeditiously than is at present possible, it being necessary with the ordinary wooden container to melt the composition maintaining the cells in position in the container and then separate the cells, whereas with a device constructed in accordance with my invention a defective cell may be removed by simply releasing the frames and removing the cell with its container, the removed cell being replaced by a new cell as a temporary measure if so desired.

From the foregoing it is believed to be obvious that a battery constructed in accordance with my invention is particularly well adapted for the purpose for which it is intended by reason of the fact that the structure thereof permits of ready removal and replacement of a defective cell and eliminates the necessity of sealing the cells in position within the container by use of a battery composition. It will furthermore be obvious that the construction as hereinbefore set forth is capable of some change and modification without materially departing from the spirit of my invention and I accordingly do not limit myself to the specific structure thereof except as hereinafter claimed.

I claim:

1. A storage battery comprising a cell container, a cell disposed within the container, a removable member abutting the upper ends of the container and cell, means connecting the member and container for forcing the member into engagement with the upper ends of the container and cell including pivoted links, and cam plates pivoted to the links and engaging said member.

2. A storage battery comprising a cell container, a cell disposed within the container, a removable member abutting the upper ends of the container and cell, means for connecting the member and container for forcing the member into engagement with the upper ends of the container and cell, including hook portions formed on said member, links pivotally connected to the container, and cam plates pivoted to the links and engaging said hook portions.

3. A storage battery comprising a cell container, a cell disposed within the container, a removable member abutting the upper ends of the container and cell, means for connecting the member and container for forcing the member into engagement with the upper ends of the container and cell, including pivoted links, cam plates pivoted to the links and engaging said member, and means for securing said cam plates in adjusted position.

4. A storage battery comprising a cell container, a cell disposed within the container, a removable member abutting the upper ends of the container and cell, means connecting the member and container for forcing the member into engagement with the upper ends of the container and cell, including hook portions formed on said member, links pivotally connected with the container, cam plates pivoted to the links and engaging said member, studs formed on said member, openings formed in said cam plates through which the studs extend, and securing members engaged with the studs and preventing return movement of said cam plates.

5. In a storage battery, a cell container, a cell disposed within the container, a resilient element disposed intermediate the bottom of the container and the cell, and means for engaging the top of the cell to force the same downwardly into engagement with the resilient member.

6. In a storage battery, a cell container, a cell disposed within the contaner, upper and lower frame members each embodying an inturned flange adapted to engage against an edge of the container, the flange of said upper frame extending over the cell, hook portions formed on said upper frame, links pivotally connected to the lower frame, and cam plates pivotally connected with said links and adapted to engage the hook portions of the upper frame.

7. A storage battery cell container comprising a rectangular shell provided adjacent the lower edge of the walls thereof with inwardly extending supports, and a removable bottom plate resting upon said supports.

8. A storage battery assembly frame comprising a plurality of cell containers each adapted to receive a storage cell, removable members abutting the upper and lower ends of the containers, and means connecting the upper and lower members forcing the upper and lower members into engagement with the upper and lower ends of the containers.

9. A storage battery assembly frame comprising a plurality of cell containers each adapted to receive a cell, removable members abutting the upper and lower ends of the containers, and a link and cam connection between the upper and lower members for forcing the upper and lower members into engagement with the upper and lower ends of the containers.

10. A storage battery assembly frame comprising a plurality of cell containers, removable rectangular frames receiving the upper and lower ends of the containers and each provided with a flange, said flanges engaging the upper and lower ends of the containers respectively, and a link and cam connection between the upper an lower frame members for forcing the upper and lower members into engagement with the upper and lower ends of the containers.

11. A multiple cell storage battery comprising a plurality of cell containers, resilient elements disposed within each cell container at the bottom thereof, cells disposed within each container and resting upon the resilient element, a removable member abutting the lower ends of the containers, a removable member receiving the upper ends of the containers and provided with a flange abutting the upper ends of the cells, and a link and cam engagement between the upper and lower members.

In testimony whereof I hereunto affix my signature.

RICHARD J. HOLDEN.